Patented Dec. 21, 1926.

1,611,700

UNITED STATES PATENT OFFICE.

SELMAN A. WAKSMAN, OF NEW YORK, N. Y.

PROCESS OF MAKING PROTEOLYTIC ENZYMES.

No Drawing.   Application filed January 19, 1920. Serial No. 352,553.

The object of this invention is to prepare a fungus culture capable of developing a high degree of proteolytic power.

My invention is based upon the utilization of the property possessed by certain fungi when properly cultivated on suitable media or substrata under proper conditions of treatment of developing proteolytic power.

The first step in the process employed in carrying out my invention is the development of a proper culture capable of being developed or propagated under proper conditions into a condition possessing strong proteolytic action. In the development of the desired culture possessing the capacity referred to certain microscopic fungi can be employed, particularly organisms belonging to *Aspergillus flavus*, *Aspergillus oryzæ* and *Aspergillus wentii* groups.

The organism is cultivated in accordance with the principle of my invention for a series of successive generations upon a medium or substratum which is rich in protein in order to still further increase or augment the proteolytic power acquired by such organism in the cultivation thereof.

Various media or substrata may be employed for the successive generations of the selected organism. In practice I have found that a medium or substratum composed of one part of rice and two parts of soya bean cake are satisfactory for this purpose. The rice and soya bean cake are mixed together and cooked with water so that the water content forms approximately forty per cent of the total mass. I do not desire, however, to be limited in respect to the specific percentage of the water content. After cooking the mass it is suitably sterilized, as, for example, with steam pressure, or any other suitable manner.

Other media or substrata may be used with good results. In practice a medium which is poor in carbohydrates and rich in proteins in the presence of the necessary salts such as potassium or magnesium salts and phosphates, and media containing peptone, pure protein, such as casein, and the like, well answers the purpose. The culture after propagation on a medium of the nature above referred to is resown on fresh masses of the medium for successive generations, allowing a sufficient time for each propagation for the development of the spores.

The second step in carrying out my invention is the development of a mass of growth of the culture, after its propagation, as above described, which furnishes a sufficient quantity of spores to inoculate large batches of medium or substratum for the production of enzymes.

The medium or substratum for the development of the culture in quantity may have the same composition as that above described for the initial successive generations of the culture. If desired, however, other media may answer the purpose. I have found that this medium can be prepared by mixing together two parts of wheat bran and two parts of soya bean cake and one part of alfalfa meal. The soya bean cake should be ground. To the mixture of the wheat bran, soya bean cake and alfalfa meal is added about forty per cent of water, and the mixture is then steamed for a sufficient length of time to sterilize it. I have found that steaming for a period of two hours is sufficient. If, however, the mixture is not sufficiently steamed to completely sterilize it, sterilization under pressure, fifteen pounds for a period of an hour and a half, may be resorted to. After sterilizing the mass it is permitted to cool and is then inoculated with the culture produced by the propagation and successive generation as above described. The culture is then allowed to develop and grow under suitable conditions of temperature and for a sufficiently long period of time to permit an abundance of spore production. I have found in practice that an abundance of spore production results when the inoculated mass is maintained at a temperature of about 30° C. for a period of about seven days. My invention, however, is not to be limited or restricted in respect to this temperature or length of time.

At the end of a proper period the spores of the fungus may be utilized for the production of a growth in order to secure a substance possessing the desired proteolytic power. The mass or medium upon which the spore production has been secured may itself be employed as an inoculum for a medium or substratum on which the final propagation is effected. Instead of using the mass containing the fungus growth as the inoculum the mass upon which the spores have been grown may be dried and sifted in order to separate out the spores for utilization in the subsequent operations of the invention. Instead of employing the medium directly or sifting the medium in its dry condition, the mass may be agitated with water in order to detach the spores from the particles of the medium upon which they have been developed and grown, the detached spores becoming suspended in the water. This water containing the spores is then strained, or otherwise manipulated, to remove any of the coarse material of the stratum upon which the spores have been developed, and the strained water carrying in suspension therein the seed spores detached from the mass may be used to inoculate the medium employed for final propagation.

The third step in the operation in carrying out my invention is the production of a growth from the spores developed and grown as above described, which growth results in the production of a substance possessing the desired proteolytic power. Any suitable medium or substratum may be employed upon which this production growth is effected. In practice I prefer to employ a substance or a mixture of substances which are rich in proteins. I have found that a mixture of one part of wheat or other bran with one to two parts of bean cake, for example, soya bean cake, which has been freed from oil and ground, to which may or may not be added one-half part of ground alfalfa meal is suitable. To this mixture water of about forty per cent is added. Instead of soya bean cake other substances may serve the purpose, such for example, as linseed oil cake, cotton seed meal, dried blood, etc., which are rich in proteins. The ground alfalfa meal employed in this mixture serves partly as a filler or body and partly as a nutrient.

The mass produced as above described is steamed from one to two hours. After the steamed mass has been permitted to cool it is inoculated with the spore material prepared and in the form above described. This inoculated mass is maintained under suitable conditions of ventilation and temperature and for the desired period of time for the fungus to develop its maximum enzymatic power. I have found it convenient to place the inoculated mass about one inch in thickness in trays, which are placed in a convenient chamber having means to provide sufficient ventilation and maintained at a suitable temperature, for example, from 28° C. to 32° C., for a period of from twenty-four to forty-eight hours. At the expiration of this time the fungus has developed its maximum enzymatic power and then its development or growth is arrested.

The next step of the process embodying my invention relates to the extraction of the enzymes for utilization for the various purposes for which enzymes possessing a high proteolytic power are desired.

The enzymes developed in the final step of propagation can be utilized in various ways. For example, the mass containing the growth can be dried at a low temperature, say below 45° C., and ground, and in that form utilized for the enzymatic power it possesses. If desired the mass containing the growth may be ground and then extracted with water by percolation, or otherwise, and the extract thus obtained which contains the enzymes in solution may be concentrated by employing the same extract to percolate successive fresh batches of the mass. If desired, the extract is filtered through suitable filter material, such for example as infusorial earth for the purpose of eliminating any suspended particles, spores, etc., contained in the extract. The extract may then be used as such with a suitable antiseptic added thereto, such as sodium fluoride phenol, cresol, chloroform, toluene, thymol, etc., in sufficient quantity to prevent fermentation, and to preserve and stabilize the extract. If desired, the water extract obtained as above described and without the antiseptic may be evaporated at a low temperature, below 45° C., and under suitable conditions of pressure and aeration, for example, partial vacuum. This concentrated material itself possesses stability and does not ferment even in the absence of an antiseptic.

If desired, a very strong enzymatic substance is obtained by precipitating the water extract without an antiseptic and without evaporation, with a substance having the power of carrying down the enzyme, such, for example, as alcohol, or certain salts, for example, ammonium sulphate. The precipitate is then dried over sulphuric acid in partial vacuo at a temperature of from 30° C. to 40° C. In this case the precipitate thus obtained may be used directly for industrial and other purposes. For food or medicinal purposes it is preferable to dialyze the salt precipitate and then either dry the same in vacuo or precipitate with a small quantity of alcohol and then dry the same. As an industrial example we might point to the process of dissolving the proteins from fibrous materials, and as an example in medicinal use the application as an agent to aid digestion is named, in which case it is taken internally after meals to digest the protein part of foods where individuals suffer from indigestion of proteins.

I have found that when precipitation is effected with ammonium sulphate a product is obtained which possesses a much higher enzymatic power than if precipitation of the water extract is accomplished with alcohol.

The product prepared in any of the ways above described possesses strong proteolytic power although it also contains other enzymes such as starch splitting lipolytic or fat splitting, etc., but to a comparatively less degree than the proteolytic power, which is the special purpose in view in carrying out my invention.

Having now set forth the object and nature of my invention, and a method of carrying the same into practical operation, what I claim as new and useful and of my own invention and desire to secure by Letters Patent is,—

1. In the manufacture of enzymes, the process of producing an inoculum which consists in developing and growing a culture having strong proteolytic properties capable of producing a growth possessing a high degree of proteolytic power, upon a medium or substrata consisting of wheat bran, bean cake and alfalfa meal.

2. In the manufacture of enzymes, the process of producing an inoculum which consists in mixing together wheat bran, ground bean cake, alfalfa meal and water, then sterilizing the mass, and then inoculating the same with a culture having strong proteolytic properties capable of producing a growth possessing a high degree of proteolytic power.

3. In the manufacture of enzymes, the process of producing an inoculum which consists in mixing together wheat bran, ground bean cake, alfalfa meal and water, then sterilizing the mass, and then inoculating the same with a culture having strong proteolytic properties capable of producing a growth possessing a high degree of proteolytic power, and finally maintaining the inoculated mass at a temperature of about 30° C. for a period of several days.

4. In the manufacture of enzymes, the process which consists in mixing together wheat bran, alfalfa meal and water, then sterilizing the mixture and then inoculating the sterilized mass with a culture having strong proteolytic properties capable of producing a growth possessing a high degree of proteolytic power.

5. In the manufacture of enzymes, the process which consists in mixing together bran, alfalfa meal and water, then sterilizing the mixture and then inoculating the sterilized mass with a culture having strong proteolytic properties capable of producing a growth possessing a high degree of proteolytic power and maintaining the inoculated mass at a temperature of from 28° C. to 32° C. for a period of twenty-four to forty-eight hours.

In testimony whereof I have hereunto set my hand on this 10th day of January, A. D. 1920.

SELMAN A. WAKSMAN.